(12) United States Patent
Al-Hokayem et al.

(10) Patent No.: US 9,831,760 B2
(45) Date of Patent: Nov. 28, 2017

(54) CONTROL METHOD FOR ELECTRICAL CONVERTER WITH LC FILTER

(71) Applicant: ABB Schweiz AG, Baden (CH)

(72) Inventors: Peter Al-Hokayem, Baden-Dättwil (CH); Tobias Geyer, Zürich (CH); Nikolaos Oikonomou, Bern (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/097,209

(22) Filed: Apr. 12, 2016

(65) Prior Publication Data
US 2016/0226368 A1 Aug. 4, 2016

Related U.S. Application Data

(63) Continuation of application No. PCT/EP2014/071218, filed on Oct. 3, 2014.

(30) Foreign Application Priority Data

Oct. 18, 2013 (EP) .................................. 13189229

(51) Int. Cl.
| | |
|---|---|
| *H02M 1/12* | (2006.01) |
| *H02P 21/14* | (2016.01) |
| *H02P 23/14* | (2006.01) |
| *H02P 21/30* | (2016.01) |

(Continued)

(52) U.S. Cl.
CPC .......... *H02M 1/126* (2013.01); *H02P 21/141* (2013.01); *H02P 21/30* (2016.02); *H02P 23/14* (2013.01);
(Continued)

(58) Field of Classification Search
CPC .......... H02M 2001/0003; H02M 1/12; H02M 1/126; G05B 2219/41406; G05B 13/04;
(Continued)

(56) References Cited

U.S. PATENT DOCUMENTS

| | | | |
|---|---|---|---|
| 5,734,249 A | 3/1998 | Pohjalainen et al. | |
| 2012/0161685 A1* | 6/2012 | Geyer ..................... | H02M 1/12 318/503 |

(Continued)

FOREIGN PATENT DOCUMENTS

EP 2469692 6/2012

OTHER PUBLICATIONS

Pompeo Marino, Michele Milano, Francesco Vasca; Linear Quadratic State Feedback and Robust Neural Network Estimator for Field-Oriented-Controlled Induction Motors; Feb. 1999; IEEE Transactions on Industrial Electronics, vol. 46, No. 1; pp. 150-161.*

(Continued)

*Primary Examiner* — Harry Behm (57) ABSTRACT

An electrical converter is interconnected via a filter with an electrical load or an electrical power source. A method for controlling the converter comprises the steps of: receiving a reference flux ($\psi^*_i$) for the electrical converter; determining output signals (y) comprising currents and/or voltages measured in the filter; determining an estimated flux ($\psi_i$) from the output signals (y); determining a corrective flux ($\psi_{i,damp}$) from the output signals (y) based on a mathematical model of the filter and a quadratic cost function; determining control input signals (u) for the electrical converter based on a sum of the estimated flux ($\psi_i$) and the corrective flux ($\psi_{i,damp}$); controlling the converter with the control input signals (u); and algorithmic filtering of at least one of the output signals (y) by applying a signal filter to the at least one output signal, which is designed for amplifying the at least one output signal at a resonance frequency of the filter, whereby the corrective flux ($\psi_{i,damp}$) is determined from the filtered output signals.

20 Claims, 6 Drawing Sheets

(51) Int. Cl.
*H02P 23/30* (2016.01)
*H02M 7/5387* (2007.01)
*H02M 1/00* (2006.01)

(52) U.S. Cl.
CPC .... *H02P 23/30* (2016.02); *G05B 2219/41406* (2013.01); *H02M 7/53873* (2013.01); *H02M 7/53875* (2013.01); *H02M 2001/0003* (2013.01)

(58) Field of Classification Search
CPC ... G05B 13/041; G05B 13/047; G05B 13/048
See application file for complete search history.

(56) References Cited

U.S. PATENT DOCUMENTS

| | | | | |
|---|---|---|---|---|
| 2014/0184135 | A1* | 7/2014 | Bazzi | H02P 23/14 318/798 |
| 2015/0003116 | A1* | 1/2015 | Karlsson | H02M 3/33538 363/17 |

OTHER PUBLICATIONS

Osama Ebrahim, Praveen Jain; Robust State Control with Narroband Disturbance Rejection for Wind Driven DFIG under Grid Voltage Unbalance; Jul. 2009, IEEE Electrical Power& Energy Conference, pp. 1-7.*

Ebrahim, Salem, Jain, Badr; Application of linear quadratic regulator theory to the stator field-oriented control of induction motors; Oct. 2010; Institute of Engineering and Technology; pp. 637-646.*

European Search Report, EP13189229.1 , ABB Technology AG, dated Apr. 3, 2014, 9 pages.

International Search Report and Written Opinion, PCT/EP2014/071218, ABB Technology, AG, dated Feb. 19, 2015; 10 pages.

Cortés, Patricio, Model Predictive Control of an Inverter With Output LC Filter for UPS Applications, IEEE Transactions on Industrial Electronics, IEEE Service Center, Piscataway, NJ, vol. 56, No. 6, Jun. 11, 2009, pp. 1875-1883.

Cortés, Patricio, Predictive Control in Power Electronics and Drives; IEEE Transactions on Industrial Electronics, IEEE Service Center, Piscataway, NJ, vol. 53, No. 12, Dec. 1, 2008, pp. 4312-4324.

Rodriguez, Jose, State of the Art of Finite Control Set Model Predictive Control in Power Electronics, IEEE Transactions on Industrial Informatics, IEEE Service Center, New York, NY, vol. 9, No. 2, May 1, 2013, pp. 1003-1016.

Sapin, Alain, Modeling, Simulations, and Test of a Three-Level Voltage-Source Inverter with Output LC Filter and Direct Torque Control, IEEE Transactions on Industry Applications, IEEE Service Center, Piscataway, NJ, vol. 43, No. 2, Mar. 1, 2007, pp. 469-475.

* cited by examiner

CONTROL METHOD FOR ELECTRICAL CONVERTER WITH LC FILTER

FIELD OF THE INVENTION

The invention relates to a method for controlling an electrical converter and a converter system.

BACKGROUND OF THE INVENTION

Electrical converters, such as active rectifiers and inverters, are used for converting a first current into a second current of different frequency, for example for supplying a load, connecting a power source to a grid or for interconnecting two electrical grids.

Specific medium voltage converters are linked with a low pass input or output filter that is passively damped through a large resistor. Typically, the filter comprises a filter inductor and a filter capacitor with a damping resistor in series. Such a filter is known as LCR filter. However, such a structure may entail substantial power losses through the resistor and may not provide an adequate current profile at the output due to slow decay rate in attenuation capabilities at higher frequencies.

Thus, a filter without a resistor (called LC filter) is very attractive from an input-output point of view, since the converter is required to have certain machine friendly behavior, exhibited through low current Total Harmonic Distortion (THD), as well as grid code compliance, exhibited through low current and/or voltage THD and individual harmonic constraints satisfaction.

From the control point of view, with only an LC filter it may be difficult to ensure stability of the closed-loop system (converter, attached cable, transformer, electrical machine, etc.). Due to the presence of a resonant peak of the LC filter, higher order resonances of the system may be amplified and the system may develop oscillations.

Possible control methods for controlling the converter may be model predictive control methods. For example, EP2469692A1 describes model predictive pulse pattern control (MP3C), which, for example, may provide fast closed-loop control of an AC machine with an N-level voltage source inverter. MP3C relies on optimized pulse patterns (OPPs) with low total harmonic distortion factors that are computed online. The OPPs are used to generate reference flux trajectories that are to be followed. MP3C comprises an online computational stage that adjusts the switching instants in the OPPs so as to maintain the flux on the reference trajectory in closed-loop.

U.S. Pat. No. 5,734,249 discloses a generic method for controlling an electrical converter for an electrical drive.

Furthermore, in "State of the Art of Finite Control Set Model Predictive Control in Power Electronics", IEEE Transactions on Industrial Informatics, 2012 discloses the possibility of using a cost function for controlling a power system with a voltage source inverter with a passive output filter, such as to damp resonant oscillations of the filter.

DESCRIPTION OF THE INVENTION

It is an object of the invention to provide an electrical converter with low power losses. It may be a further object of the invention to provide an electrical converter, which is adapted to effectively dampen oscillations caused by an LC filter.

These objects are achieved by the subject-matter of the independent claims. Further exemplary embodiments are evident from the dependent claims and the following description.

An aspect of the invention relates to a method for controlling an electrical converter interconnected via a filter with an electrical load or electrical power source. An electrical converter may be an active rectifier or inverter for transforming a DC current into an AC current and vice versa, respectively. In general, the converter may be an N-level converter, i.e. a converter having an N-level output voltage at the AC side. An electrical converter may comprise semiconductor switches that are controlled by a controller for controlling the currents flowing through the converter.

It has to be noted that the converter may be a high power converter that is adapted for processing currents of more than 100 A and/or more than 1000 V.

According to an embodiment of the invention, the method comprises the steps of: determining output signals comprising currents and/or voltages measured in the filter; determining an estimated flux from the output signals; determining a corrective flux from the output signals based on a mathematical model of the filter and a quadratic cost function, the mathematical model modelling the output signals together with the corrective flux; determining control input signals for the electrical converter based on a sum of the corrective flux and the estimated flux as corrected estimated flux; and controlling the converter with the control input signals. In particular, a reference flux for the electrical converter may be determined or received and a flux error may be set to a difference of the reference flux and a sum of the estimated flux and the corrective flux. The control input signals then may be determined from the flux error.

In general, the determination of a corrective flux based on a model of the filter may be seen as an outer control loop that is added to a (conventional) control method, which may not take the filter inter account, as inner control loop. The outer control loop adds corrections to the reference flux that is utilized by the inner control loop to control the converter.

The outer control loop may be seen as an additional damping method that is based on a mathematical model of the filter (and optionally further components of the system such as the converter, grid, load, power source, etc.) determines a corrective flux from the output signals such that excitations caused by the resonant filter are damped. It has to be noted that not the inner control loop actively dampens the oscillations but that already the reference flux is adjusted by the outer control loop.

The mathematical model may comprise differential equations. The corrective flux is determined by minimizing the cost function under the equality constraints that these equations are fulfilled. For time-invariant equations this may be done offline resulting in a linear equation relating the corrective flux to the output signals.

With the control method, oscillations, that are produced by (the otherwise) undampened output or input filter of the converter, are actively damped.

Due to the generality of choosing or selecting the mathematical model and/or the cost function, the control method is applicable to higher order systems (filters, transformers, long cables, etc.) as it is naturally designed to handle Multiple Input Multiple Output (MIMO) type systems.

The filter may be an electrical filter and/or LC filter.

According to an embodiment of the invention, the mathematical model is based on differential equations modelling the behaviour of the filter (and optionally the converter). The differential equations may be linear (time-invariant) state-space equations and/or the model may be a harmonic model. These equations may be determined offline and are based on the topology of the filter and/or the converter.

In general, the cost function may be a quadratic function of the output signals (which may be time-dependent values/vectors that are determined every time instant of the system) and may have a linear term.

According to an embodiment of the invention, the mathematical model of the filter is solved and/or used offline and the corrective flux is determined by integrating a filter voltage calculated with a linear equation from the output signals, which is derived from the mathematical model.

According to an embodiment of the invention, the output signals comprise at least one of: a converter current between the converter and the filter, a load current between the filter and the load, a converter side filter voltage across the filter on the converter side, and a load side filter voltage across the filter on the load side. Not all of these values have to be measured. It may be possible that one or more of these values are calculated from the others or estimated.

Furthermore, it has to be understood that all fluxes, currents and voltages mentioned in the present disclosure may be vectors (in a multiphase system) or may be scalars (in a single-phase system).

According to an embodiment of the invention, the filter comprises an inductor connecting the converter and the load and a capacitor connected in parallel to the load and the converter. In particular, the filter may not comprise a resistive component, i.e. may be a resonant or sine filter (i.e. an LC filter).

The method further comprises the steps of: filtering at least one of the output signals by applying a signal filter (for example a band-pass filter) on at least one output signal, which is designed for amplifying at least one output signal at a resonance frequency (or in a range of a resonance peak) of the filter and determining the corrective flux from the at least one filtered output signal. The filtering may be performed algorithmically, for example by a software module.

It may be possible that all output signals that are used for determining the corrective flux are filtered by a band-pass signal filter, in particular the same band-pass filter.

An LC filter usually is tuned in such a way that its resonance frequency is higher than a frequency of the AC current. For example, the resonance frequency may be higher than 100 Hz and the rated frequency of the converter, rotating electrical machine and/or electrical grid may be about 50 Hz. Usually, the transfer function of the filter is peaked in a range near the resonance frequency and higher order frequency components in the current produced by the system converter/load or converter/power source may be amplified near the resonance frequency.

According to an embodiment of the invention, the signal filter is designed for stronger phase shifting the at least one output signal at frequencies different from the resonance frequency as at the resonance frequency.

In general, the signal filter may be used to extract the components (frequencies and optional phase shifts at these frequencies) of the output signals in a range around the resonance frequency.

It has to be understood that the signal filter may be implemented as a software module and/or the determination of the corrective flux may be implemented with a further software module.

Summarized, the outer control loop may be provided by a flux corrector module and optionally a signal filter module that provide a corrective flux to be provided to the inner control loop that may be implemented as a controller that need not be aware of the filter.

With respect to the inner control loop, the controller performing the inner control loop also may comprise several modules. The estimated flux may be provided by a state estimator that estimates the estimated flux and other variables relating to the state of the converter system from the input signals. For example, the estimator furthermore may estimate a reference torque and/or a reference speed. For example, the reference flux may be provided by a torque controller based on the reference torque and/or the reference torque may be provided by a speed controller based on the reference speed.

In particular, the inner control loop may be based on model predictive control.

According to an embodiment of the invention, the control input signals are determined by a model predictive control method based on a (second) mathematical model of the converter and/or the filter and a second cost function (that is solved online). For example, the second cost function penalizes the flux error, which is dependent on the corrective flux determined by the outer control loop.

According to an embodiment of the invention, the control input signals are determined by moving and/or modifying time instants of a selected pulse pattern for the converter such that the second cost function is minimized. The control method of the inner control loop may be MP3C, which may be provided with information regarding the content of the output signals around the resonance frequency. Thus, the controller may react to such information and may actively dampen the filter-induced oscillations.

According to an embodiment of the invention, the control input signals comprise switching states of the converter. For example, these switching states may be provided by pulse patterns that are determined with respect to the flux error calculated with the aid of the corrective flux.

Further aspects of the invention relate to a computer program that, when being executed on a processor, is adapted for performing the steps of the method and to a computer-readable-medium on which such a computer program is stored. A computer-readable medium may be a floppy disk, a hard disk, an USB (Universal Serial Bus) storage device, a RAM (Random Access Memory), a ROM (Read Only Memory) and an EPROM (Erasable Programmable Read Only Memory). A computer-readable medium may also be a data communication network, e.g. the Internet, which allows downloading a program code.

However, the control method may also be implemented at least partially in hardware.

For example, the control method may be implemented on any computational hardware including DSPs, FPGAs, microcontroller, CPUs, GPUs, multi-core platforms, and combinations thereof.

A further aspect of the invention relates to a controller for controlling an electrical converter, wherein the controller is adapted for performing the steps of the method as described in the above and in the following. For example, the controller may comprise one or more of the above mentioned processors.

A further aspect of the invention relates a converter system comprising a converter for transforming a first electrical current into a second electrical current, an filter connected with the converter and a controller that is adapted for performing the control method as described above and in the following.

According to an embodiment of the invention, the electrical converter comprises at least one of an inverter and an active rectifier and/or the converter is connected to a load or a power source via the filter.

For example, the converter system may be an electrical drive with an inverter that is adapted for supplying an electrical motor with AC current generated from a DC link. The filter may be interconnected between the inverter and the motor. In this case, a long cable (with a high inductance) may be connected between the filter and the motor.

In another example, the electrical motor may be replaced with an electrical generator and the converter system may comprise an inverter for supplying a DC link with power generated by the generator.

Further, it is possible that the converter system comprises a rectifier that is connected via the filter with an electrical grid.

It has to be understood that features of the control method as described in the above and in the following may be features of the computer program, computer-readable medium, controller and converter system as described in the above and in the following as well as vice versa.

Summarized, the main aspects of the present disclosure may be summarized as follows:

An accurate model of the overall converter system (which may be called harmonic or mathematical model) is derived. The model may encode a converter, an filter, a transformer, a long cable, an electrical machine and/or an electrical grid. The model is based on output signals of the converter system.

Regardless of the order (number of states) of the converter system, the relevant signal content (i.e. filtered output signals) may be extracted related to the resonance frequency of the filter. This may be achieved by a signal filter.

Using the mathematical model and the (optionally filtered) output signals, a controller is designed that generates corrective signals (in particular a corrective flux), which are added to some or all of estimated signals (in particular an estimated reference flux). This is accomplished by an active damping entity or unit of the controller implementing the mathematical model and a corresponding solver.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
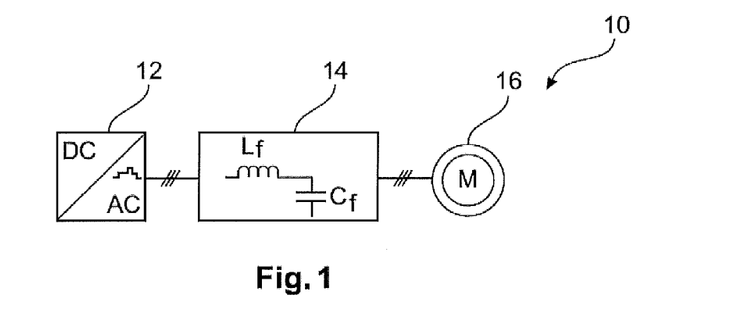
FIG. 1 schematically shows a converter system according to an embodiment of the invention.

FIG. 1 shows a converter system 10 with an inverter (DC-to-AC converter) 12 connected on an output side via an LC filter 14 with a rotating electrical machine 16, such as a generator or electrical motor. As indicated, the converter 12 may have a three-phase output. However, the converter system 10 also may be a single phase system.

The inverter 12 produces an N-level output voltage, which is smoothed by the LC filter 14, which comprises a filter inductor $L_f$ connected between the converter 12 and the rotating electrical machine 16. A filter capacitor $C_f$ is connected in parallel to the converter 12 and/or rotating electrical machine 16. It has to be understood that in a multi-phase system, the filter inductor $L_f$ and filter capacitor $C_f$ (as well as the components described below) comprise a number of physical inductors and capacitors corresponding to the number of phases.

Figure 2:
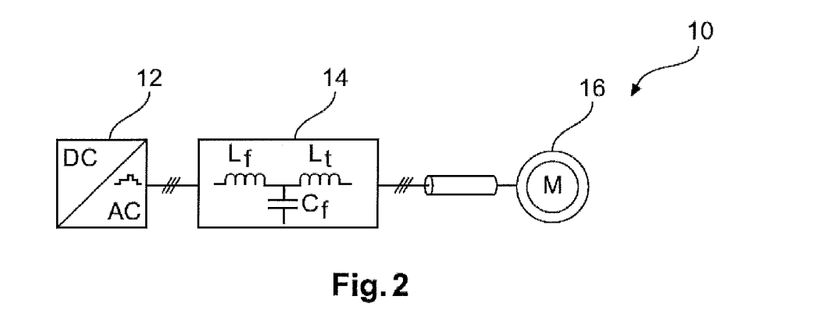
FIG. 2 schematically shows a converter system according to a further embodiment of the invention.

FIG. 2 shows a further converter system 10 that additionally has a long cable 18 between the LC filter 14 and the rotating electrical machine 16. The inductance of the long cable 18 is integrated into the LC filter 14 as inductor $L_t$.

Figure 3:
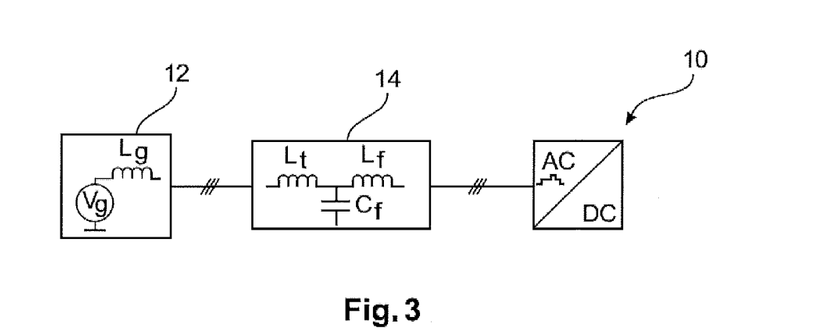
FIG. 3 schematically shows a converter system according to a further embodiment of the invention.

FIG. 3 shows a converter system 10 with an active rectifier (AC-to-DC converter) 12 connected on an input side to a grid 20, which has an impedance $L_g$. An optional transformer between the converter 12 and the grid 20 is shown as inductor $L_t$.

It is possible that the setup shown in FIG. 1 or 2 is combined with the setup of FIG. 3 with a DC link and that the converter system 10 has an input LC filter 14 on the input side and an output LC filter 14 on the output side. Also such a system may be controlled with a controller as will be explained with respect to FIG. 5.

Figure 4:
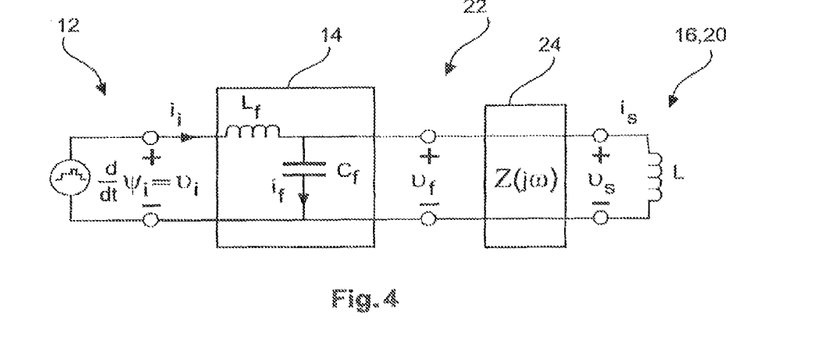
FIG. 4 shows a harmonic model of a converter system according to a further embodiment of the invention.

FIG. 4 shows a diagram visualizing a harmonic/mathematical model 22 of the converter system 10: an LC filter 14 is connected through an impedance $Z(j\omega)$ to the total leakage impedance L of the machine 16 or impedance of the grid 20.

All the cases of FIGS. 1 to 3 may be modeled as shown in FIG. 4, as a general impedance $Z(j\omega)$ (shown as impedance block 24 and an inductance L. L could represent the leakage inductance of an induction machine $L_o$ (for example as in FIGS. 1 and 2) or the grid impedance $L_g$ (for example as in FIG. 3). The model 22 usually may be applicable to frequencies beyond the fundamental frequency of the converter system 10, for example less than 100 Hz. The impedance block 24 may model one or several storage components such as capacitors or inductors with an associated state, voltage or current, respectively, for example a long cable in between the converter 12 and the machine 16 or grid 20.

The variables in FIG. 4 are named for the case of an inverter 12 connected to a machine 16, but may be also applicable to the other cases described above. FIG. 4 shows the inverter flux $\psi_i$, which is the time derivative of the inverter voltage $v_i$ (at the output of the inverter 12 or the input of the filter 14), the inverter current $i_i$ (at the output of the inverter 12 or the input of the filter 14), the capacitor current if through the capacitor $C_f$ of the LC filter 14, the filter voltage of $v_f$ (after the LC filter 14), the stator voltage $v_s$ and the stator current $i_s$.

For simplicity, in the following it is focused on the cases of FIGS. 1 and 2 (with inverter) and $L=L_\sigma$, and it is assumed that the impedance $Z(j\omega)$ is the identity, i.e., $$v_f = v_s, i_s = i_i - i_f$$

However, the presented results also hold for the general case of FIG. 4. The transfer function relating the capacitor/filter voltage $v_f$ of to the inverter voltage $v_i$ is given by $$\frac{v_f(s)}{v_i(s)} = \frac{(L_\sigma s)//\left(\frac{1}{C_f s}\right)}{L_f s + (L_\sigma s)//\left(\frac{1}{C_f s}\right)} = \frac{\frac{L_\sigma s}{L_\sigma C_f s^2 + 1}}{L_f s + \frac{L_\sigma s}{L_\sigma C_f s^2 + 1}} = \frac{\frac{1}{L_f C_f}}{s^2 + \frac{L_\sigma + L_f}{L_\sigma L_f C_f}}$$

As such, the resonance frequency of the LC filter 14 is given by $$f_{res} = \frac{1}{2\pi \sqrt{\frac{L_\sigma L_f C_f}{L_\sigma + L_f}}}$$

As already mentioned, the LC filter 14 is added in order to attenuate unwanted harmonic content of the output currents (and possibly voltages depending on the type of grid codes used) of the converter 12 (rectifier or inverter). As multi-level converter 12 operates in discrete voltage levels that may be fractions of the full DC link voltage, which may produce harmonics at frequencies other than the fundamental frequency f0 (for example 50 Hz).

On the one hand, the LC filter 14 may have a steep attenuation rate for the harmonic content beyond the resonance frequency $f_{res}$ (for example more than 100 Hz); thus the harmonic content for very high frequencies is almost eliminated. This positive effect is accompanied by a substantial magnification of the harmonic content around the resonance frequency. In particular, since there is no passive resistive element in the LC filter 14, it may create oscillations in the converter system 10, which may have a detrimental effect on stability and performance. This resonance may also cause drastic deterioration in the performance of any underlying controller being used. This is because the control relies on the measured signals to generate correcting actions, and these signals would be tainted with unwanted oscillations, if the filter resonance is left undamped.

Therefore, as will be described in detail with respect to FIG. 5 and the following figures, an outer control loop is added that takes these oscillations into account and induces an artificial damping into the closed-loop system.

Figure 5:
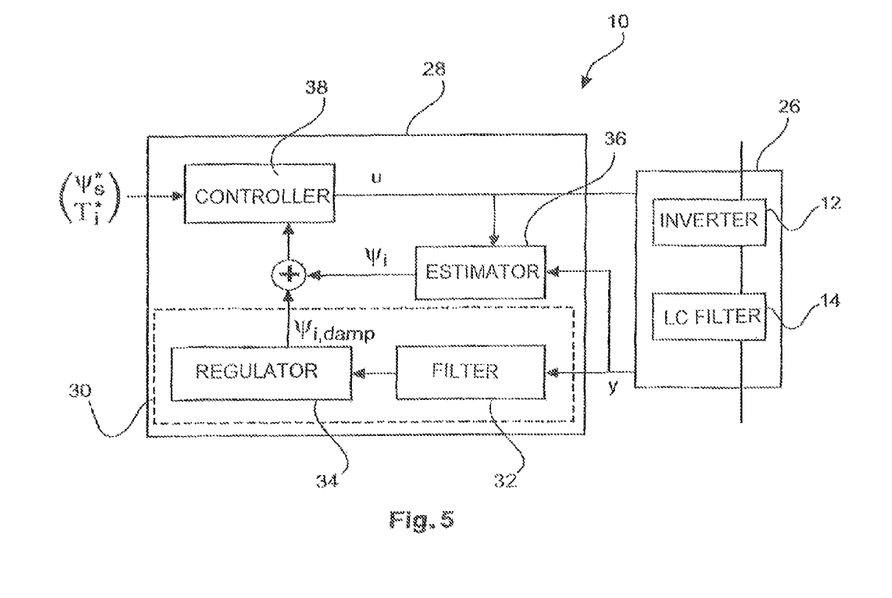
FIG. 5 schematically shows a converter system according to a further embodiment of the invention.

FIG. 5 shows a converter system 10 with a converter 12 and an LC filter 14. The block 26 may be seen as an electrical drive of the system 10. The system 10 further comprises a controller 28 that also may be employed in the system shown in FIGS. 1 to 3.

The controller 28 receives output signals y (for example measurement values of currents and/or voltages in the system 10) and generates control output signals u (for example switching instants for the converter 12) based on a (stator) reference flux $\psi^*_s$; and/or a (inverter) reference torque $T^*_i$. Note that as explained below, the stator related quantities all may be replaced with more general, for example grid related quantities and the inverter related quantities may be replaced with more general, for example rectifier related quantities.

The controller 28 comprises a damping block/damping module 30 that generates a corrective (inverter) flux $\psi_{i,damp}$ from the output signals y that is added to an estimated (inverter) flux $\psi_i$. In particular, the damping module 30 comprises a signal filter 32 for filtering the output signals y and a regulator 34 for determining the corrective flux $\psi_{i,damp}$ The estimated flux $\psi_i$ is provided by an estimator 36 and is calculated from the control input signals u and the output signals y.

The corrected estimated flux, i.e. the sum of corrective flux $\psi_{s,damp}$ and estimated flux $\psi_i$ is input to a converter controller 38 that need not be aware of the LC filter 14. The converter controller 38 generates the control input signals u based on the reference flux $\psi^*_s$ and/or the reference torque $T^*_i$.

Figure 6:
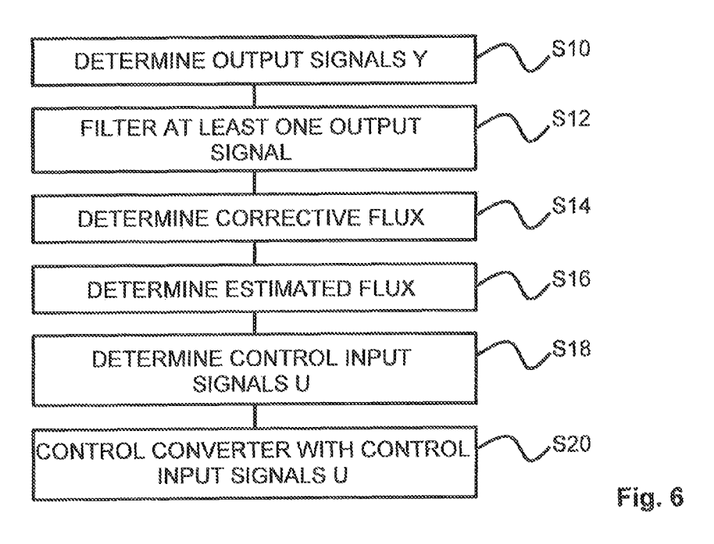
FIG. 6 shows a flow diagram for a method for controlling a converter according to an embodiment of the invention.

FIG. 6 shows a flow diagram for a control method that may be performed by the controller 28.

In step S10, output signals y are determined, which may comprise currents $i_i$, $i_s$, $i_f$ and/or voltages $v_i$, $v_f$, $v_s$, measured in the LC filter 14 and/or derived from such currents and/or voltages.

In step S12, at least one of the output signals y is filtered by the signal filter 32, which may be designed for amplifying the at least one output signal at a resonance frequency of the LC filter 14.

In step S14, a corrective flux $\psi_{i,damp}$ is determined from the filtered output signals y by the regulator 34, which may use the mathematical model 22 of the LC filter 14 and a quadratic cost function as will be explained below.

In step S16, an estimated flux $\psi_i$ is determined from the output signals by the estimator 36.

In step S18, control input signals u are determined by the converter controller 38 for the electrical converter 12 based on a sum of the estimated flux $\psi_i$ and the corrective flux $\psi_{i,damp}$ as corrected estimated flux.

In step S20, the converter 12 is controlled with the control input signals u. For example, switching instants may be applied to the semiconductor switches of the converter 12.

Embodiments of the modules/blocks 32, 34, 36 and 38 will be described in the following.

Signal Filter

The signal filter module 32 receives outputs signals y, in particular the measured output signals $[i_i \ v_f \ i_s]^T$. More precisely, one is interested in extracting the frequency content of all measured signals around the resonance frequency of the LC filter 14. With such a signal filter 32, a desired attenuation outside a certain frequency band around a resonance frequency $f_{res}$ of the LC filter 14 may be achieved.

Figure 7:
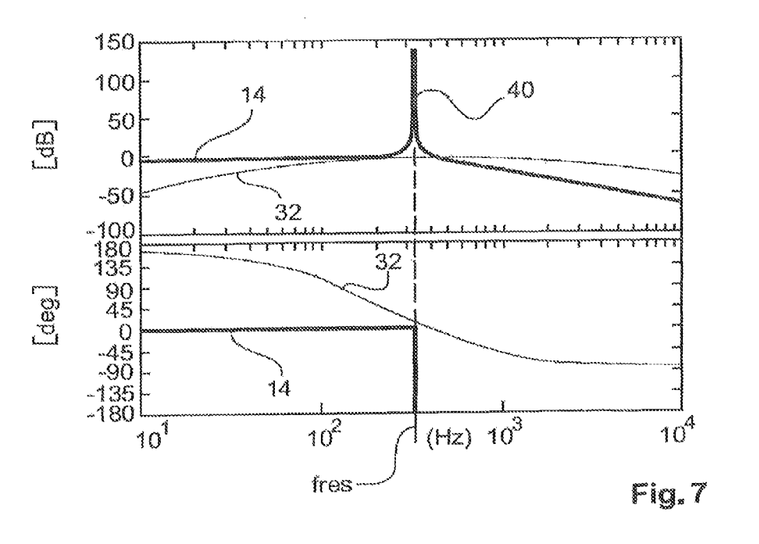
FIG. 7 shows a diagram describing properties of a signal filter for a converter system according to a further embodiment of the invention.

FIG. 7 shows two diagrams with a damping of signals (upper diagram) and a phase shift (lower diagram) of the LC filter 14 and the signal filter 32. The frequency of the signals is depicted to the right. The signal filter 32 is designed such that the output signals y are strongest attenuated at the resonance frequency $f_{res}$ and/or peak 40 of the LC filter 14. Furthermore, the signal filter may compensate for the phase shift of the LC filter 14.

The signal filter module 32 may be based on an n-th order band-pass filter that extracts the content around the resonant peak 40 of the LC filter 14. A choice of such filter with the gain c, m zeros, and n poles is given by the transfer function $$H(s) = \frac{c\left(s + \frac{1}{T_z}\right)^m}{\left(s + \frac{1}{T_p}\right)^n}$$

The constant $1/T_z$ dictates the location of the zeros, which should typically fall below the resonance frequency $f_{res}$. The constant $1/T_p$ dictates the location of the poles, which should typically be chosen such that a certain phase shift is achieved at the resonance frequency $f_{res}$. The constant c provides a degree of freedom to adjust the DC-scaling. The number of zeros should be less or equal to the number of poles, i.e., m≤n. All parameters may be chosen, for example, to have almost zero phase angle around the resonance frequency $f_{res}$.

Regulator

The regulator module 34 is based on the mathematical model 22 as depicted in FIG. 4, which may rely on the filtered version of the measured output $[i_i \; v_f \; i_s]^T$ provided by the signal filter module 32.

The model 22 may be only valid for frequencies significantly higher than the fundamental frequency of the system 10, including the resonance frequency $f_{res}$ of the LC filter 14. In mathematical formulas, the model 22 may be described by a linear time-invariant state-space model in the continuous-time domain $$\frac{d}{dt}x = Ax + Bv_i$$

The system matrices A and B may be derived from the underlying circuit for the converter system 10. For example, the mathematical model describing the circuit shown in FIG. 4 without the impedance $Z(j\omega)$ is given by $$\frac{d}{dt}\begin{bmatrix} i_i \\ v_f \\ i_s \\ \psi_{i,damp} \end{bmatrix} = \begin{bmatrix} 0 & \frac{-1}{L_f}I & 0 & 0 \\ \frac{1}{C_f}I & 0 & \frac{-1}{C_f}I & 0 \\ 0 & \frac{1}{L_\sigma}I & 0 & 0 \\ 0 & 0 & 0 & 0 \end{bmatrix} \begin{bmatrix} i_i \\ v_f \\ i_s \\ \psi_{i,damp} \end{bmatrix} + \begin{bmatrix} \frac{1}{L_f}I \\ 0 \\ 0 \\ I \end{bmatrix} v_i$$

$$y = Cx = \begin{bmatrix} I & 0 & 0 & 0 \\ 0 & I & 0 & 0 \\ 0 & 0 & I & 0 \end{bmatrix} \begin{bmatrix} i_i \\ v_f \\ i_s \\ \psi_{i,damp} \end{bmatrix}$$

The model is based on differential equations of the (filtered) output signals $[i_i \; v_f \; i_s]^T$ and the corrective flux $\psi_{i,damp}$ as states. The mathematical model may be simulated on a computing unit and as such we have access to the corrective flux $\psi_{i,damp}$.

Using the mathematical model described above, we define the associated quadratic objective or cost function $$\mathcal{J} = \int(x^T Q x + v_i^T R v_i)dt$$

where $Q = C^T C$ which does not have any penalty on the magnitude of the corrective flux $\psi_{i,damp}$. R may be chosen as identity matrix. The problem posed by the mathematical model and the cost function may be seen as a linear quadratic regulator (LQR) control problem.

In the case, the matrices A, B, C, Q and R are not time-dependent, the problem may be solved offline (being a quadratic problem for minimizing the cost function with the above equations as constraints). In this case, the optimal control input (with respect to this problem but not of the controller 28) is then given by $$v_i = K_{LQR}x = -R^{-1}B^T P x$$

where the matrix P is positive-definite symmetric and solves the algebraic Riccati equation $$0 = A^T P + PA + Q - PBR^{-1}B^T P$$

The resulting corrective flux $\psi_{i,damp}$, which is the integral of the voltage v, is used by the converter controller 38, as will be explained in detail below.

Estimator

The estimator module 36 may have access to measured or computed quantities, based on the state of storage elements in the converter: DC-link voltages, phase capacitor voltages, filter inductor current, etc.

In particular, the estimator module 32 receives or computes the inverter output voltage $v_i$ (possibly by reconstructing it based on the DC link voltage and the switching instants of the control input u). Furthermore, it may receive the measured inverter current $i_i$ and the filter capacitor current $i_f$.

The estimator module 36 may produce at least one or more of the following quantities:

The estimated inverter flux $\psi_i$ at the output of the inverter 1 and/or the input of the LC filter 12.

The estimated stator and/or filter output flux $\psi_s$ at the output of the LC filter 12 and/or the input to the electrical machine 16.

The estimated virtual filter and/or inverter torque $T_i$ at the output of the inverter 12 and/or the input of the LC filter 12. The torque $T_i$ may be computed based on the cross product between the estimated inverter flux $\psi_i$ and the inverter current $i_i$, or the cross product between the estimated inverter flux $\psi_i$ and the estimated filter capacitor flux. The computation differs by a constant that depends on the filter inductance $L_f$.

The estimated stator or filter output speed $\omega_s$.

Converter Controller

In general, the converter controller 38 may be based on any control method, for instance DTC (direct torque control) and/or PWM (pulse width modulation).

The converter controller 38 may be based on model predictive control, i.e. may comprise a further mathematical model and a further cost function that is optimized with respect to the equations of the mathematical model as constraints. For example, the converter controller 38 may be based on MPDTC (model predictive direct torque control) and/or MP3C (model predicted pulse pattern control).

In the following, a converter controller 38 based on MP3C will be described in more detail.

MP3C is a method to achieve fast closed-loop control of a rotating machine 16 with a voltage source inverter 12 using discrete voltage levels. MP3C relies on optimized pulse patterns (OPPs) with low total harmonic distortion factors that are computed offline. The OPPs are used to generate reference flux trajectories that are to be followed. The core of MP3C is an online computational stage that adjusts the switching instants in the OPPs so as to maintain the flux on the reference trajectory in closed-loop. The stator flux may be controlled based on the estimated stator and rotor fluxes, respectively.

As shown with respect to FIG. 2, the rotating machine 16 is connected to the inverter 12 through an LC filter 14 and possibly long cables 18 and a step-up transformer. Therefore, in the present disclosure, the MP3C method is adapted to handle the oscillations resulting from this resonant overall system.

Inherent to the MP3C mechanism is a core online functionality that compares the estimated flux to the reference flux that is generated from the online-computed OPPs. For example, the estimated stator flux may be compared with the reference stator flux. In the present disclosure it is focused on controlling the inverter flux.

Figure 8:
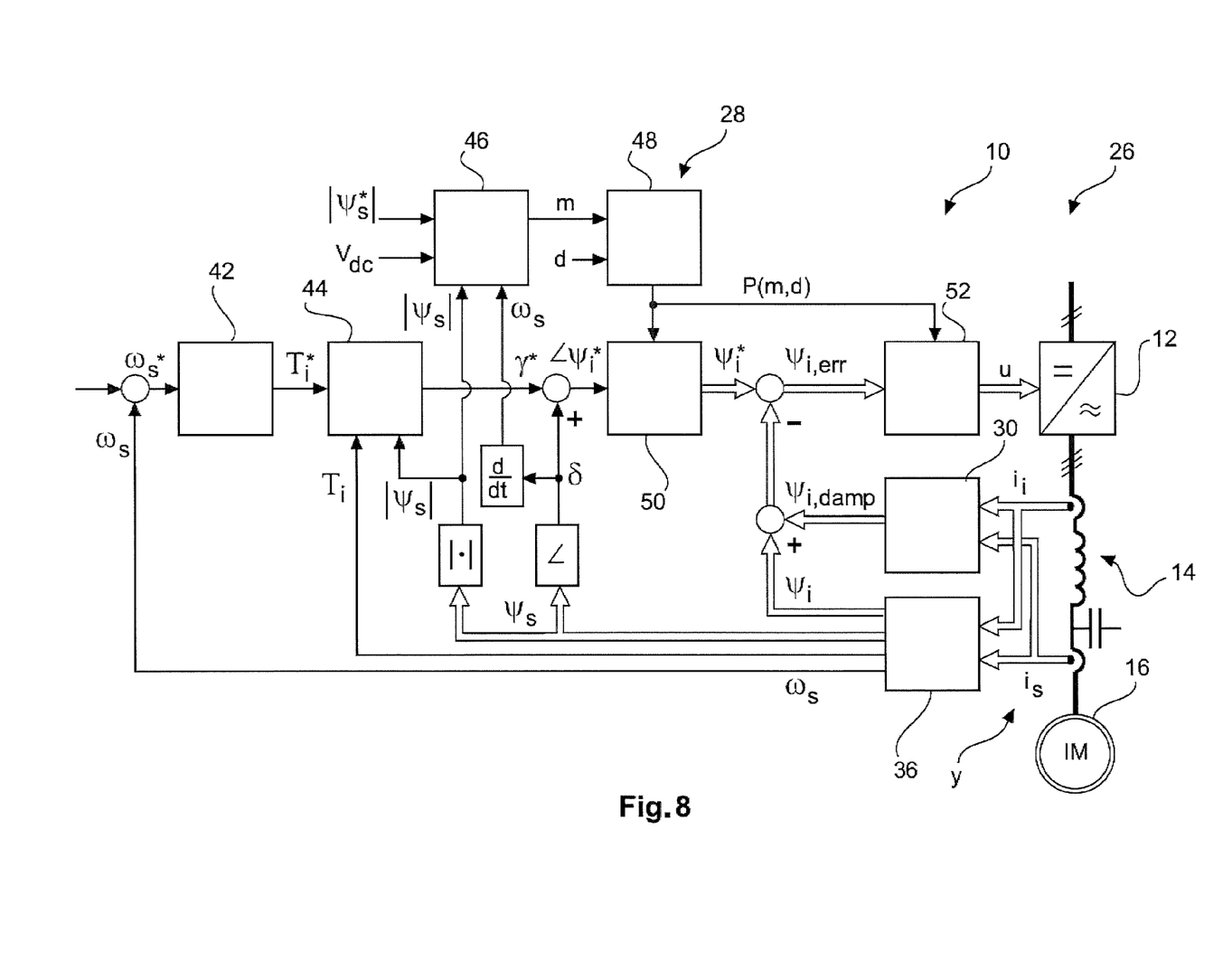
FIG. 8 schematically shows a converter system according to a further embodiment of the invention.

FIG. 8 shows an MP3C converter controller 38 as inner control loop with an active damping module 30 as described above as outer control loop.

The MP3C controller 38 comprises a speed controller (module) 42, a torque controller (module) 44, a flux controller (module) 46, a pattern selector (module) 48, a flux reference controller (module) 50, and a pattern controller (module) 52.

Figure 9:
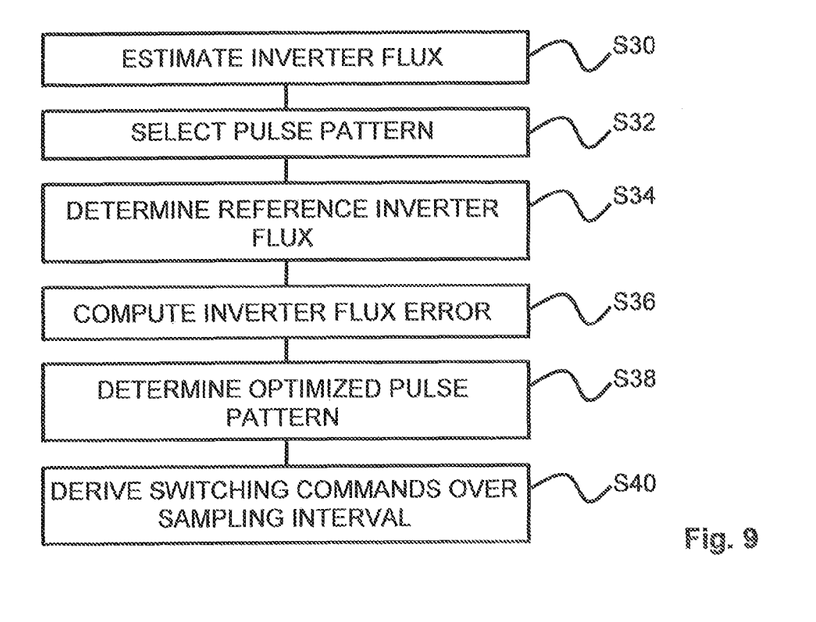
FIG. 9 shows a flow diagram for a method for controlling a converter according to a further embodiment of the invention.

The operation of these modules will be described with reference to FIG. 9, which shows a flux diagram for a method to be performed by the controller 28 of FIG. 8.

The controller 28 may operate in the discrete time domain and/or may be activated at equally spaced time-instants $kT_s$, with the natural number k being the discrete time-step and $T_s$ denoting the sampling interval. The control problem may be formulated and solved in stationary orthogonal coordinates. The algorithm comprises the following six steps, which are executed at the time-instant kTs.

In step S30, the estimator 36 estimates the estimated inverter flux (vector) $\psi_i$ and estimated stator flux (vector) $\psi_s$ in the stationary reference frame.

Let $<\psi$ denote the angular position of a flux vector and $\|\psi\|$ its magnitude. Note, that in case there is a long cable 18 at the output of the inverter 12, then $\psi_s$ would be replaced with the estimated filter flux (vector) $\psi_f$ corresponding to the filter voltage $v_f$.

In step S32, the flux controller 46 and the pattern selector 48 select a pulse pattern P(m, d), wherein m is the modulation index and d is the pulse number, i.e. number of switches per quarter period of the fundamental frequency.

In step S34, the reference inverter flux (vector) $\psi^*_i$ is determined.

The speed controller 42 determines a so-called reference inverter torque $T^*_i$ from the difference of a reference speed) $\omega^*_s$ and an estimated speed) $\omega_s$ provided by the estimator 36.

Therefrom, the torque controller 44 then determined the angle or phase $<\psi^*_i$ of the reference inverter flux $\psi^*_i$. The inverter torque $T_i$ can be written as $T_i = 1/L_f \|\psi_s\| \|\psi_i\| \sin \gamma$, where $L_f$ is the resonant filter inductance, and $\gamma$ is the angle between the inverter flux vectors. For a given value of the stator flux magnitude and a given torque reference, the desired angle between the stator and rotor flux vectors is $$\gamma^* = \sin^{-1}\left(\frac{L_f T^*_i}{\|\psi^*_i\| \|\psi_s\|}\right)$$

The reference flux vector $\psi^*_i$ is then obtained by the flux reference controller 50 by integrating the chosen nominal three-phase pulse pattern that is generated by the pattern selector 48 (see below). The reference angle $<\psi_s + \gamma^*$ constitutes the upper limit of the integral. The resulting instantaneous reference flux vector has, in general, a magnitude and angle that slightly differ from their respective values on the unitary circle.

In step S36, the inverter flux error $\psi_{i,err}$ is computed, which is the difference between the inverter reference flux vector $\psi^*_i$ and the estimated inverter flux vector $\psi_{i,err}$, with a further correction term $\psi_{i,damp}$ coming from the active damping module 30 as described above.

$$\psi_{i,err} = \psi^*_i - \psi_i - \psi_{i,damp}$$

In step S38, an optimized pulse pattern is determined by pattern controller 52 from the selected pattern P(m, d). The optimized pulse pattern and the corresponding switching instants are the control input u for the converter 12.

The MP3C control problem can be formulated as an optimization problem with a quadratic objective function and linear constraints, a so-called quadratic program (QP). The objective function penalizes both the corrected flux error $\psi_{i,err}$ (the controlled variable) and the changes of the switching instants (the manipulated variable), using the diagonal weight matrix Q, whose components are very small. Specifically, the QP is formulated as $$\min_{\Delta t}(\|\psi_{i,err} - \psi_{i,corr}(\Delta t)\|_2^2 + \Delta t^T Q \Delta t)$$

$$s.t.\ kT_s \leq t_{a1} \leq t_{a2} \leq \ldots \leq t_{an_a} \leq t^*_{a(n_a+1)}$$

$$kT_s \leq t_{b1} \leq t_{b2} \leq \ldots \leq t_{bn_b} \leq t^*_{b(n_b+1)}$$

$$kT_s \leq t_{c1} \leq t_{c2} \leq \ldots \leq t_{cn_c} \leq t^*_{c(n_c+1)}.$$

The corrections of switching instants are aggregated in the vector $$\Delta t = [\Delta t_{a1} \Delta t_{a2} \ldots \Delta t_{an_a} \Delta t_{b1} \ldots \Delta t_{bn_b} \Delta t_{c1} \ldots \Delta t_{cn_c}]^T$$

For phase a, for example, the correction of the i-th transition time is given by $\Delta t_{ai} = t_{ai} - t^*_{ai}$, where $t^*_{ai}$ denotes the nominal switching instant of the i-th transition $u_{ai}$. Again, the latter is defined as $\Delta t u_{ai} = u_a(t_{ai}) - u_a(t^*_{ai} - dt)$ with dt being an infinitesimally small time step. Moreover, $n_a$ denotes the number of switching transitions in phase a that are within the prediction horizon, and $t^*_{a(n_{a+1})}$ refers to the first nominal switching transition beyond the horizon. The quantities for phases b and c are defined accordingly.

The switching instants cannot be modified arbitrarily. For the three phases, the set of constraints is imposed, which constrains the switching instants in two ways. Firstly, by the current time-instant $kT_s$, i.e. transitions cannot be moved into the past. Secondly, by the neighboring switching transitions in the same phase, ensuring that the correct sequence of switching transitions is kept.

Figure 10:
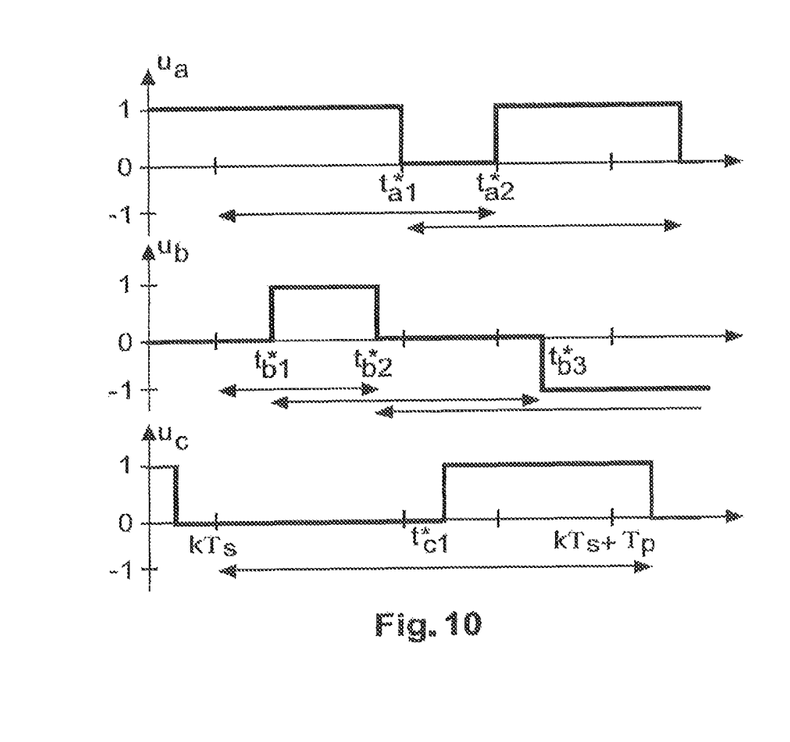
FIG. 10 shows a diagram with pulse pattern for controlling a converter according to an embodiment of the invention.

FIG. 10, which refers to a model predictive pulse pattern control (MP3C) problem for a three-phase three-level pulse pattern, provides an example to illustrate this. Six switching transitions fall within the horizon $T_p$, which is of fixed length. The lower and upper bounds for the nominal switching instants are depicted by arrows.

The first switching transition in phase b, for example, is constrained to lie between $kT_s$ and the nominal switching instant of the second transition in phase b, $t^*_{b2}$. The second switching transition in phase b can only be delayed up to the nominal switching instant of the third transition in the same phase, $t^*_{b3}$. In this example, the number of transitions that fall within the prediction horizon are $n_a=2$, $n_b=3$ and $n_c=1$. Note that the transitions in a given phase may be modified independently from those in the other phases.

The horizon length $T_p$ is a design parameter. If required, $T_p$ may be increased so as to ensure that switching transitions in at least two phases fall within the horizon. Consider again FIG. 10. In case $T_p$ is smaller than $t*_{b2}-kT_s$, it may be increased to this value.

In the end, the pattern controller 52 removes the switching transitions from the QP that will occur within the sampling interval. This may be accomplished by updating a pointer to the look-up table that stores the switching angles of the OPP and the respective three-phase potential values.

In step 40, the pattern controller 53 derives the switching commands over the sampling interval, i.e. the switching instants and the associated switch positions. The switching commands are sent to the gate units of the semiconductor switches in the inverter 12.

Note that the same approach of active damping may also hold for the Dead Beat version of the MP3C method.

Simulation Results

A simulation has been performed for a medium-voltage drive system 10, encompassing a five-level active neutral point clamped (ANPC) inverter 12, an LC filter 14, a short cable 18 and a 6 kV squirrel-cage induction machine 16 rated at 1 MVA with a total leakage inductance of $L_\sigma$=0.18 pu.

The rated values of the machine 16 are summarized in the following table.

| Parameter | | SI value |
|---|---|---|
| Voltage | $V_R$ | 6000 V |
| Current | $I_R$ | 98.9 A |
| Real power | $P_R$ | 850 kW |
| Stator frequency | $f_{sR}$ | 50 Hz |
| Rotational speed | $\omega_{mR}$ | 1494 rpm |

The pu system is established using the base quantities $V_B=\sqrt{2/3}V_R$=4899 V, $I_B=\sqrt{2}I_R$=139.9 A and $f_B=f_R$=50 Hz.

The machine, filter and inverter parameters are summarized in Table 2 as SI quantities and pu values, along with their respective symbols.

| Parameter | | SI value | | pu value |
|---|---|---|---|---|
| Stator resistance | $R_s$ | 203 mΩ | $R_s$ | 0.0057 pu |
| Rotor resistance | $R_r$ | 158 mΩ | $R_r$ | 0.0045 pu |
| Stator leakage inductance | $L_{ls}$ | 9.968 mH | $L_{ls}$ | 0.0894 pu |
| Rotor leakage inductance | $L_{lr}$ | 10.37 mH | $L_{lr}$ | 0.0930 pu |
| Main inductance | $L_m$ | 277.8 mH | $L_m$ | 2.492 pu |
| Number of pole pairs | p | 2 | | |
| Filter inductance | $L_f$ | 12.75 mH | $L_f$ | 0.114 pu |
| Filter capacitor | $C_f$ | 31.0 μF | $C_f$ | 0.341 pu |
| Dc-link voltage | $V_{dc}$ | 9.8 kV | $V_{dc}$ | 2.000 pu |
| Dc-link capacitor | $C_{dc}$ | 200 μF | $X_{dc}$ | 2.201 pu |
| Phase capacitor | $C_{ph}$ | 140 μF | $X_{ph}$ | 1.541 pu |

Note that the value of the dc-link capacitance refers to one half of the dc-link, i.e. either the upper or the lower half. The cable 18 is with 100 m very short and can thus be neglected.

The LC filter 14 has very small, effectively negligible, resistors associated with the filter inductor and capacitor. As such, the only passive damping provided by the circuit is due to the machine's stator resistance. Since the stator resistance is very small in a medium voltage setting, the passive damping provided by the sum of resistances in the system is almost zero. This in fact is highlighted by simulation results shown in FIGS. 11A and 11B, which show the electromagnetic torque and the stator currents in pu. At nominal speed, a torque reference ramp from 1 to 0 pu is applied for 10 ms.

Figure 11A:
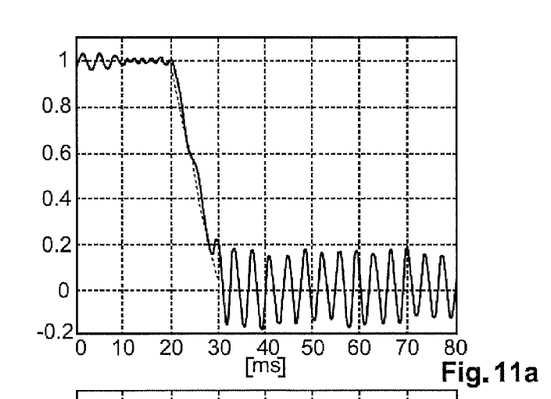
FIGS. 11A and 11B show diagrams with torque and currents of a converter system during a torque transient.
Figure 11B:
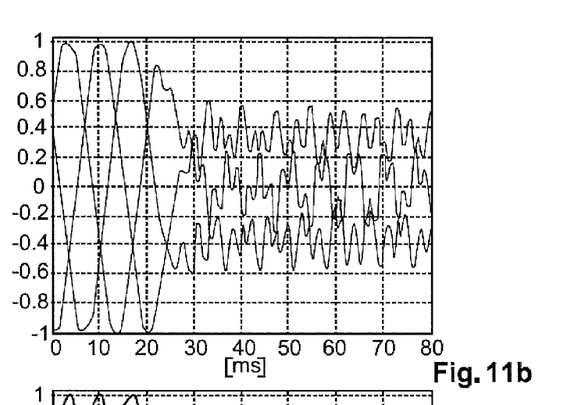

The MP3C converter controller 28 (without the damping module 30) manipulates the inverter flux vector such that the torque accurately follows this ramp. The ramp excites the filter resonance at 320 Hz. When using baseline MP3C without the outer damping loop provided by the active damping module 30, the resonance is not actively dampened. The passive damping tends to reduce the amplitude of the oscillations, as can be seen in FIG. 11A, but the rate of decay is very slow, amounting to a few seconds.

Figure 12A:
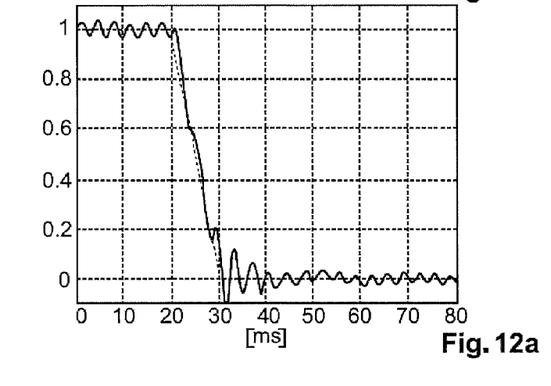
FIGS. 12A and 12B show diagrams with torque and currents during a torque transient of a converter system according to an embodiment of the invention.
Figure 12B:
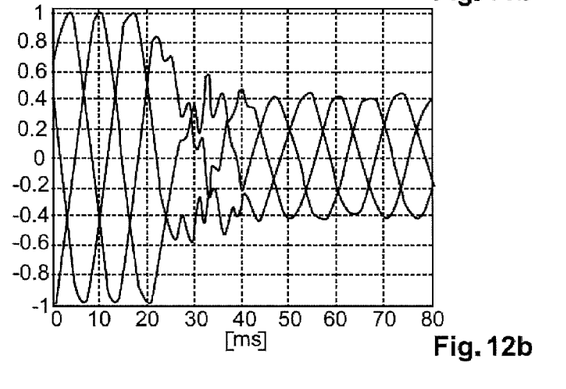

FIGS. 12A and 12B show corresponding diagrams but for a combination of MP3C controller 28 with an active damping loop provided by the damping module 30. It can be seen that oscillations are quickly and effectively removed within about 10 ms. The remaining minor ripple is due to the 5th and 7th harmonics in the optimized pulse pattern.

When using long cables of lengths amounting to several km or even tens of km, significant ohmic resistance is added to the system, which provides passive damping. As such, the case of an LC filter 14 without a cable of significant length may constitute the worst case, in the sense that this setup provides the least passive damping.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 converter system
12 electrical converter
14 LC filter
16 electrical load
18 cable
20 electrical grid
22 model
24 impedance block
26 electrical drive
28 controller
30 damping module
32 signal filter module
34 regulator module
36 estimator module
38 converter control module
40 resonant peak
42 speed controller module
44 torque controller module
46 flux controller module
48 pattern selector module
50 flux reference controller module
52 pattern controller module

The invention claimed is:

1. A method for controlling an electrical converter interconnected via a filter with an electrical load or electrical power source, the method comprising the steps of:

determining output signals comprising currents and/or voltages measured in the filter;

determining an estimated flux from the output signals;

determining a corrective flux from the output signals based on a mathematical model of the filter and a quadratic cost function;

determining control input signals for the electrical converter based on a sum of the estimated flux and the corrective flux;

controlling the converter with the control input signals;

algorithmic filtering of at least one of the output signals by applying a signal filter to the at least one output signal, which is designed for amplifying the at least one output signal at a resonance frequency of the filter, whereby the corrective flux is determined from the filtered output signals.

2. The method of claim 1, receiving a reference flux for the electrical converter;

setting a flux error to a difference between the reference flux and the sum of the estimated flux and the corrective flux;

determining control input signals for the electrical converter based on the flux error.

3. The method of claim 2, wherein the mathematical model is based on differential equations modelling the behaviour of the filter.

4. The method of claim 2, wherein the mathematical model of the filter is solved offline and the corrective flux is determined by integrating a filter voltage calculated via the minimization of the quadratic cost function subject to the mathematical model, with the result being a linear equation from the output signals.

5. The method of claim 2, wherein the output signals at least comprise one of:

a converter current between the converter and the filter, a load current between the filter and the load or power source, a converter side filter voltage across the filter on the converter side, and a load side filter voltage across the filter on the load side or power source side.

6. The method of claim 2, wherein the filter comprises an inductor connecting the converter and the load or power source and a capacitor connected to the load or power source and the converter.

7. The method of claim 2, wherein the control input signals are determined by a model predictive control method and a second cost function;

wherein the second cost function penalizes the flux error.

8. The method of claim 1, wherein the mathematical model is based on differential equations modelling the behaviour of the filter; and wherein the cost function is not quadratic in the corrective flux.

9. The method of claim 1, wherein the mathematical model of the filter is solved offline and the corrective flux is determined by integrating a filter voltage calculated via the minimization of the quadratic cost function subject to the mathematical model, with the result being a linear equation from the output signals.

10. The method of claim 1, wherein the output signals at least comprise one of:

a converter current between the converter and the filter, a load current between the filter and the load or power source, a converter side filter voltage across the filter on the converter side, and a load side filter voltage across the filter on the load side or power source side.

11. The method of claim 1, wherein the filter comprises an inductor connecting the converter and the load or power source and a capacitor connected to the load or power source and the converter.

12. The method of claim 1, wherein the signal filter is designed for different phase shifting of at least one output signal at frequencies different from the resonance frequency.

13. The method of claim 1, wherein the control input signals are determined by a model predictive control method and a second cost function;

wherein the second cost function penalizes the flux error.

14. The method of claim 13, wherein the control input signals are determined by modifying switching time instants of a selected pulse pattern for the converter such that the second cost function is minimized.

15. The method of claim 1, wherein the control input signals comprise switching states of the converter.

16. A controller for controlling an electrical converter interconnected via a filter with an electrical load or electrical power source, comprising:

the controller structured to determine output signals comprising currents and/or voltages measured in the filter;

the controller structured to determine an estimated flux from the output signals;

the controller structured to determine a corrective flux from the output signals based on a mathematical model of the filter and a quadratic cost function;

the controller structured to determine control input signals for the electrical converter based on a sum of the estimated flux and the corrective flux;

the controller structured to control the converter with the control input signals; and the controller structured to perform algorithmic filtering of at least one of the output signals by applying a signal filter to the at least one output signal, which is designed for amplifying the at least one output signal at a resonance frequency of the filter, wherein the corrective flux is determined from the filtered output signals.

17. A converter system, comprising:

an electrical converter for transforming a first electrical current into a second electrical current;

a filter connected with the converter; and a controller for cant rolling the converter, the controller structured to determine output signals comprising currents and/or voltages measured in the filter;

the controller structured to determine an estimated flux from the output signals;

the controller structured to determine a corrective flux from the output signals based on a mathematical model of the filter and a quadratic cost function;

the controller structured to determine control input signals for the electrical converter based on a sum of the estimated flux and the corrective flux;

the controller structured to control the converter with the control input signals; and the controller structured to perform algorithmic filtering of at least one of the output signals by applying a signal filter to the at least one output signal, which is designed for amplifying the at least one output signal at a resonance frequency of the filter, wherein the corrective flux is determined from the filtered output signals.

18. The converter system of claim 17,
wherein the electrical converter comprises at least one inverter and at least one active rectifier.

19. The converter system of claim 18,
wherein the converter is connected to a load and/or a power source via the filter.

20. The converter system of claim 17,
wherein the converter is connected to a load and/or a power source via the filter.

* * * * *